Figure 1:
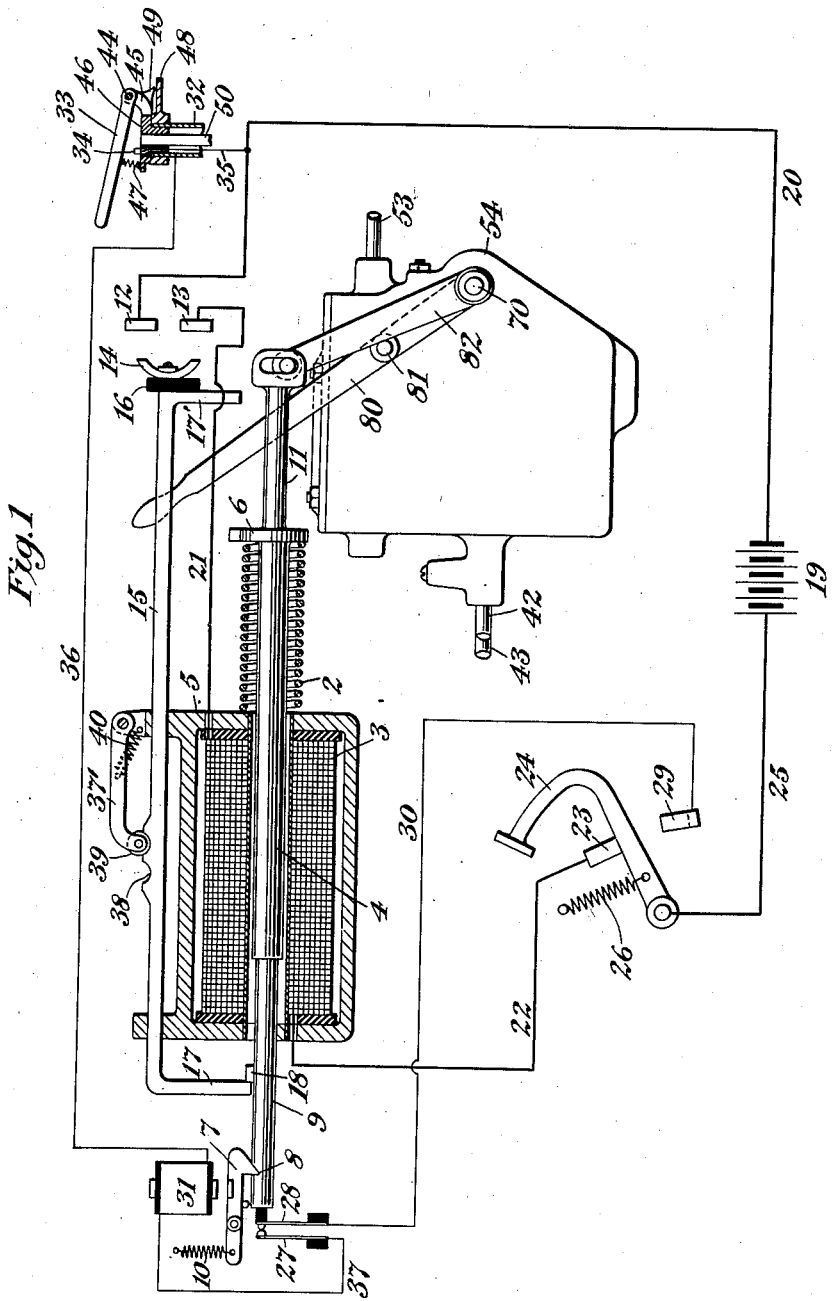

C. R. UNDERHILL.
GEAR SHIFTING MECHANISM.
APPLICATION FILED NOV. 19, 1913.

1,115,876.

Patented Nov. 3, 1914.
2 SHEETS—SHEET 1.

Witnesses:
Chas. D. King.
Rose Eisenstadt

Inventor:
Charles R. Underhill
by
Attorney.

C. R. UNDERHILL.
GEAR SHIFTING MECHANISM.
APPLICATION FILED NOV. 19, 1913.

1,115,876.

Patented Nov. 3, 1914.

2 SHEETS—SHEET 2.

Witnesses:
Chas. D. King
Rose Eisenstadt

Inventor:
Charles R. Underhill
by
Attorney.

UNITED STATES PATENT OFFICE.

CHARLES R. UNDERHILL, OF NEW HAVEN, CONNECTICUT.

GEAR-SHIFTING MECHANISM.

1,115,876. Specification of Letters Patent. Patented Nov. 3, 1914.

Application filed November 19, 1913. Serial No. 801,789.

*To all whom it may concern:*

Be it known that I, CHARLES R. UNDERHILL, a citizen of the United States, and a resident of New Haven, in the county of New Haven and State of Connecticut, have invented certain new and useful Improvements in Gear-Shifting Mechanism, of which the following is a specification.

This invention relates to gear-shifting mechanism, and especially to an apparatus of this type for use on motor-cars, motor-trucks, etc., and the principal object of the invention is to provide a simple type of mechanism operable with a minimum expenditure of power for use wherever the shifting of gears to change speed is required.

In gear-shifting mechanism as generally employed on motor vehicles it is customary to bring about the necessary shifting movements of the gears in changing from one speed to another by the expenditure of electrical energy, or energy in a different form operating in an equivalent manner. In such mechanisms as heretofore used there has been a great waste of energy in performing the necessary gear-shifting movements. In electrical gear-shifting mechanisms as heretofore constructed these losses are due to several conditions. One of these is that when an electric circuit for energizing a gear-shifting solenoid or other electrical device is closed time is required for the current to build up and additional time is required to get in motion the mass to be moved. After this additional time, and frequently a very great amount of time, elapses before the gears to be connected go into mesh with each other, owing to the different speeds at which these gears are moving. All of these conditions when the circuit is closed and current on result in the waste of electrical energy and consequent early exhaustion of the battery or other source of energy. A similar waste occurs when pneumatic, hydraulic or other equivalent form of energy is similarly employed for performing the gear-shifting operations.

The principal feature of my present invention is the employment in a gear-shifting mechanism, as a substitute for an electrical, pneumatic, hydraulic, or other equivalent power device for performing the actual work of shifting the parts to change from one speed to another, of an operating power device of such a character that its use will result in a very considerable saving of energy in shifting a part or parts to change from one speed to another. The preferred type of power device is one in which the energy expended is used to move the load and no energy is expended while the gears to be brought into mesh are in contact but not in mesh, and none is wasted on the building up of an electric current or any equivalent thereof. A spring of proper type fulfils these requirements, and the preferred means employed by me for performing the work of effecting the necessary gear-shifting movements is a normally energized operating power device that does not waste its energy in the manner that a normally deënergized solenoid for example, does after its circuit is closed, a normally energized spring such as a helical spring normally under compression being the operating power device preferred by me for this purpose. In changing from one speed to another in a gear-shifting mechanism it is also important to employ operating means the maximum effort of which will be exerted at the beginning of the gear-shifting operation, as a considerable amount of energy is required to start the movement of the mass to be shifted. Here again electrical energy is at a disadvantage, as a power device operated by current that has just begun to build up exerts its minimum effort at the beginning and its power thereafter increases. A spring, however, exerts its maximum effort at the start and its power thereafter gradually diminishes as used. From this point of view also a spring normally energized and in readiness for operation is superior to the usual solenoid as a gear-shifting medium. In order, however, to assure proper control of the gear-shifting operations and to reduce to the minimum the time required to energize the operating power device, I prefer to employ electrical energy as the means for energizing such power operating device, it being used herein as the means for compressing a strong helical operating spring. The preferred construction is one in which an electrical power circuit including a solenoid or other suitable energizing power device is employed for putting the operating spring under compression, and a controlling electric circuit is employed for releasing the energized spring. In such case the power circuit may be relatively short, from which there results the additional advantage of the reduction of the drop of the power current; while the controlling circuit may be made of comparatively fine wire and will utilize but little current since it, as well as the power circuit, is intended to be closed but a short period of time at each gear-shifting operation.

A further important feature of the invention is that the power circuit and the controlling circuit just referred to are preferably so related that there will always be a normally open break in one of them except when the circuit of one of them is intentionally closed (either manually or automatically) to bring about a desired operation or operations. The electrical power device for energizing the operating power-device is preferably utilized as a means for automatically opening substantially reciprocally two breaks, one in the power circuit and the other in the controlling circuit, it being understood, of course, that there is always normally another break in the controlling circuit. By properly inter-relating these power and controlling circuits each will be automatically broken as soon as it performs its function or functions, and there will be no waste of current. The two gaps in the power and controlling circuits respectively which are automatically opened and closed are preferably under the control of a double-throw switch governed by a solenoid in the power circuit, which on one stroke of its plunger serves to open one and close the other of its breaks, and on its opposite stroke operates to close the first break and open the second. When so controlled the power and controlling circuits will be made and broken in proper order and there will be no interference or repetition of operations. The preferred construction is one in which a power device normally operates to close the power circuit, which then energizes the solenoid, the plunger of said solenoid then operating to energize the operating power device or spring, after which it automatically opens a break in the power circuit and automatically closes a break in the controlling circuit, leaving the controlling circuit which normally has two open breaks with but a single break which will be closed whenever the operating power device is to be released for performing its gear-shifting function. Obviously this second break in the controlling circuit may be closed automatically when desired though it is usually closed by manual action.

In my prior application, Serial No. 793,986, filed October 8, 1913, I have disclosed a gear-shifting mechanism embodying a single operating power device for performing each one of a plurality of gear-shifting operations. I have also illustrated in the present case a single operating power device for performing each one of a plurality of gear-shifting operations, but in the present case said operating power device is of the improved type hereinbefore described. As to the feature of control of multiple gear-shifting operations by a single operating power device, my present invention is also an improvement upon that of my aforesaid application. It is also an improvement upon the selecting mechanism and various other features of control of both a single and multiple gear-shifting operation or operations by an operating device of either the manual or power type.

Figure 2:
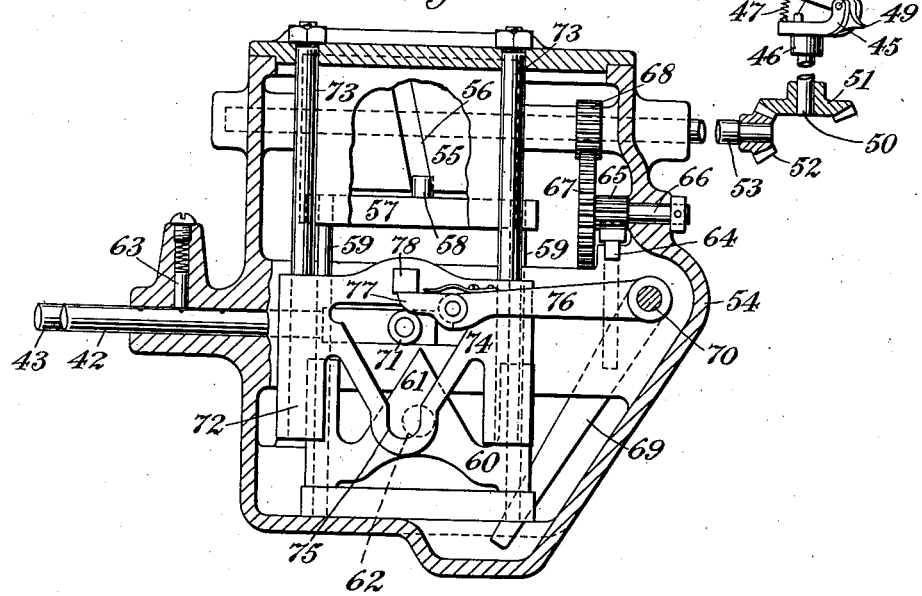
Figure 3:
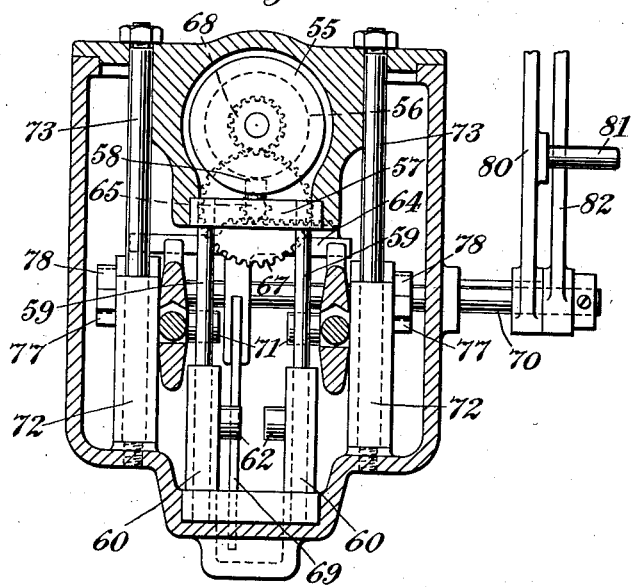

These and various other features of my invention not hereinbefore referred to but which will be hereinafter described and claimed are illustrated in the accompanying drawings in which, Figure 1 is a sectional elevation and diagram of a type of gear-shifting mechanism illustrating one embodiment of my present invention; Fig. 2 is an enlarged, vertical, longitudinal section of the main portion of the gear-shifting mechanism, and Fig. 3 is an enlarged vertical, transverse section of the same.

Similar characters designate like parts in all the figures of the drawings.

In carrying my invention into effect I may, as in my prior application before referred to, make use of any well-known or suitable type of gearing capable of being shifted to different positions corresponding to the various positions or speeds in or for which such gearing may be set. As the particular type of gearing used forms no part of my present invention I have not illustrated the gears themselves but merely one embodiment of my present improvements in gear-shifting mechanism by means of which embodiment the desired changes in the positions and in the speed relations of the gears may be made.

In my prior application before referred to I have illustrated as the active or operating means for performing the gear-shifting function an actuator in the form of a solenoid the plunger of which is mechanically connected to suitable means for transmitting movement to the gear or gears to be shifted. This solenoid of my aforesaid prior application is contained in a normally open circuit and hence is deënergized. It is therefore not normally in a condition for operating the gear to be shifted. In the present case I employ, as previously stated, an operating power device which is normally in condition for performing the gear-shifting function.

The preferred operating power device is one in which power is not only normally ready for use, but is one in which the potential energy of the device while available for substantially instantaneous release is normally under restraint. The specific normally energized operating power device illustrated is a helical spring, 2, which is held under compression by suitable means.

In connection with an operating power device the potential energy of which is normally available for shifting a gear from one position to another, I make use of an energizing power device or power-supplying means for the purpose of storing energy in said operating power device which constitutes here the power-applying means. The preferred means employed for this purpose is an electrical device energized by current in a suitable power circuit embodying a source of electrical energy. The electrical device illustrated is a solenoid similar to that of my prior application, but here said solenoid is not employed as an operating power device for performing any gear-shifting function, but only as a means for energizing the operating power device before described, which it does by putting the spring 2 under compression, that is to say, it performs the function of cocking the spring so as to store the potential energy in the spring, which spring will then be held cocked under restraint until it is desired to shift a gear, when said spring will be released and its potential energy will become instantaneously kinetic and will shift a gear substantially instantaneously to a new position. The solenoid illustrated here as the energizing power device is indicated at 3. Its plunger or core is shown at 4. The pull of said plunger when energized serves to put the spring 2 under compression, in this case between the frame or casing, 5, of the solenoid and a collar, 6, at the outer end of the plunger 4. On each energization of the solenoid 3 the plunger 4 is drawn in to the limit of its stroke and the spring 2 consequently is compressed at such time to its maximum extent. In this position the spring is intended to be held until released for the purpose of shifting a gear to the new position. Any suitable means may be employed for the purpose of holding the spring energized, that is, under compression in the present case. The means illustrated is a spring-held latch, 7, the nose of which is adapted to engage in a notch, 8, in a rod, 9, forming an extension of the plunger 4, but made of non-magnetic material. When the plunger 4 is drawn in to the limit of its in-stroke the latch 7 will be pressed into the notch 8 by the spring, 10, and the plunger 4 and its extension, together with the spring 2, will be held under restraint until released and will maintain said spring in condition for instantaneous release of its stored energy when the latch 7 is withdrawn from said notch. When so withdrawn the spring 2 will instantaneously move said plunger and its extension 9 to the right in Fig. 1, which movement will serve through suitable power-transmitting connections to shift a gear to a new position to bring about a change in speed. Here this movement of the plunger is transmitted to a reciprocating member or rod, 11, suitably connected to the other transmitting elements the operation of which will be hereinafter described.

The solenoid 3 may be connected in any suitable power circuit for the purpose of energizing and deënergizing it, but the preferred type of circuit is one in which the solenoid is only momentarily energized, that is to say, just long enough to perform the operation of energizing the operating power device or spring 2. Immediately after this the circuit of said solenoid should be broken, and in this case it is intended to remain interrupted until the completion of a cycle of operations of the energizing and operating power devices, after which the circuit of the solenoid may be closed again. The solenoid itself is here employed as the means for deënergizing itself, it serving to operate in this instance a switch for opening a gap in the power circuit through the solenoid. This gap is illustrated as located at the contacts 12 and 13, which are normally spanned by a bridging contact, 14, operated directly by the extended end 9 of the plunger 4. The bridging contact 14 is illustrated as carried by a switch-rod, 15, though insulated therefrom, as illustrated at 16, this switch-rod or slide being mounted here in guides extending up from the casing of the solenoid and having near its opposite end a projection, 17, in the path of an actuator or projection, 18, on the extended end 9 of the plunger 4, the parts being so combined that at about the end of the in-stroke of the plunger 4 the projection 18 will strike the projection 17 and shift the rod 15 to the left in Fig. 1, thereby opening up the power circuit at the contacts 12—13. The main power circuit it will be seen is from a suitable source of energy, 19, through conductor, 20, to contact 12, bridging contact 14, contact 13, conductor 21, leading to one side of the solenoid, the solenoid 3 itself, a conductor, 22, leading from the other side of the solenoid to a contact 23, and back to the battery 19 by way of a circuit-controller, here in the form of a switch carried by a clutch-lever, 24, connected by a conductor, 25, to the other side of the source of energy 19. Thus it will be seen that in the particular embodiment of my invention illustrated there are two breaks in the power circuit, one of which, at 12—13, is governed by an automatic circuit-controller or switch. So far as the intermittent energization and deenergization of the solenoid 3 is concerned, the break at 12—13 is sufficient for the proper operation of the apparatus. As a matter of convenience, however, a second break is shown, which break may be employed in connection with motor vehicles or other apparatus when desired. It is here shown as controlled by the usual foot-lever or clutch-lever of a motor-car or motor-truck. When such a second gap is employed it is desirable to provide power means for normally closing this second gap in the power circuit. A suitable power device for the purpose is the usual spring, 26, by means of which a clutch-lever such as 24 is held retracted.

It will be clear from the foregoing that whether the second gap in the power circuit just described is used or not the circuit at that point will always normally be closed so that current will flow momentarily through the solenoid when the break 12—13 is closed. In this specific embodiment of the invention the second gap is automatically maintained closed by power, and manual action is required to open this second break in the power circuit.

The release of the potential energy of the operating power device is preferably governed by a controlling electric circuit. This controlling circuit, though it is intended to be like the power circuit in that it will be economical of current and will be only momentarily closed, is unlike the power circuit in that in the specific embodiment illustrated it is normally open. Its current may be derived from the same source of energy as the current of the power circuit, but the controlling circuit will preferably consist mainly of fine wire conductors and will utilize but little of the current of the source of energy in controlling the operation of the gear-shifting mechanism. Its circuit must have at least one break (and need have but one for the purpose of controlling the maintenance of the necessary sequence of operations of the gear-shifting mechanism) and this break is one similar to that at 12—13 in the power circuit in that it is a break automatically closed and opened intermittently through the action of the solenoid 3. Unlike the break at 12—13, however, this break in the controlling circuit is normally open and is intended to be closed only at the end of the instroke of the plunger 4 of the solenoid and while said plunger and the operating device energized by the movement of said plunger are held under restraint. The break in question in this controlling circuit is here between a pair of contacts, such as 27 and 28, the latter of which is in position to be engaged by the end of the extension 9 of the plunger 4 and brought into engagement with the contact 27 substantially at the moment that the plunger reaches the end of its instroke. In all other positions of the plunger the gap between these contacts will be open. The contacts 27—28 may be connected to any suitable source of energy, but here are shown as connected in circuit with the source 19, their circuit being also illustrated as having an additional break or breaks which is or are provided for the purpose of determining the times when the mechanism illustrated shall go through its sequence of operations, but which have no control over the time or sequence of operations of any cycle after such cycle is begun. Here there are two breaks in the controlling circuit in addition to that shown at 27—28. One of them is at the circuit-controller governed by the foot-lever or clutch-lever 24 and is a break that is intended to be manually closed by the depression of said foot-lever. The contact with which said foot-lever coöperates to control this second break in the controlling-circuit may be such as indicated at 29. Said contact 29 is shown as connected by a conductor, 30, with contact 28. In part said controlling-circuit traverses the same course as the power-circuit, viz., through conductor 24, source of energy 19 and a portion of the conductor 20. From the conductor 20, however, a branch passes to contact 27. This branch embodies, as the principal controlling element, means, such as a small electromagnet, 31, for releasing the latch 7 to set free the potential energy of the operating power device for shifting a gear. The manner in which this latch is released will be obvious. As soon as it is released the gap 27—28 will be automatically opened and the plunger 4 will be quickly thrown to the end of its out-stroke. The gap 27—28 will remain open until said plunger reaches the end of its in-stroke again and hence the controlling-circuit, after being once closed and its magnet 31 once energized to release the latch 7, cannot be closed again until the solenoid 3 is again energized by the power circuit and the operating power device 2 again energized by said solenoid. In addition, however, to the necessary automatically opened and closed break at 27—28, and in addition to the break at 29 controlled by the manual or foot-lever 24, the controlling circuit in this case has a third break which is intended to be governed also by a manual circuit-controller, which circuit-controller will usually be, in the case of a motor vehicle, on the steering-head, 32, of said vehicle, as illustrated, for example, at the right in Fig. 1. The device shown at this point, so far as its electrical functions are concerned, comprises merely the switch-lever, 33, grounded on the steering-head 32 and adapted to engage a contact 34 insulated from said steering-head and the switch-lever and connected, in this instance, by a conductor, 35, to the conductor 20. A conductor, 36, is shown as leading from the steering-head 32 to one side of the controlling electromagnet 31, the other side of which is connected by a conductor, 37, to a contact 27 to complete the controlling circuit.

It will be seen from the foregoing that the power circuit is quite short and that the solenoid, the source of energy or battery, and the automatic switch constituting the principal means for making and breaking the power circuit, can be quite close together, and hence that there will be but little drop in the power circuit. Moreover, as each of these circuits is only momentarily closed, each being broken practically instantaneously after being made, the draft upon the battery will be sustained for the minimum amount of time. In addition, during each brief period that the controlling-lever is closed but little current is used in it, owing to the employment of a fine wire conductor in said circuit.

The parts just described for operating the bridging contact 14 to open and close the gap at 12—13 and for operating the contact 28 to close and open the gap at 27—28, constitute a double-throw switch governed by the solenoid 3 and here illustrated as governed directly by the movements of its plunger 4, the construction being such that the bridging contact 14 and the contact 28 will alternately and substantially reciprocally open and close two gaps, one in the power circuit and the other in the controlling circuit, and one on one stroke and the other on the opposite stroke of said plunger; from which it will be clear that there can be no interference with the predetermined sequence of operations of the mechanism controlled and operated by these two circuits. On the in-stroke of the plunger the spring will be compressed and latched and the break at 12—13 in the power circuit then opened and that at 27—28 in the controlling circuit then closed, and on the release of the latch 7 and the outward movement of the plunger the gap at 27—28 in the controlling circuit will be opened and at the end of the out-stroke the gap at 12—13 in the power circuit will be closed; and this regardless of the manner in which the circuit-controller at 24 is operated with respect to the respective contacts 23 and 29 of the power and controlling circuits, and irrespective also of the manner in which the switch-lever 33 may be operated with respect to the contact 34.

The rod 15 has at its right-hand end a projection, 17', somewhat similar to that at 17 at its opposite end, and adapted to be engaged and actuated by the plunger substantially as is the projection 17. Here the collar 6 (or a projection therefrom) serves as the actuating means and operates near the end of the out-stroke of the plunger to strike the projection 17' and force the rod 15 to the right to cause the bridging contact 14 to close the gap at 12—13 in substantially the same manner that near the end of the in-stroke of said plunger the projection 18 thereof is caused to engage the projection 17 of the rod 15 and move said rod 15 to the left to open said gap 12—13. In order that the rod 15 may be held positively in each of its two controlling positions it is desirable to make use of a detent, such as the spring-pressed arm, 37', carrying a roller for engaging in either of a pair of notches, 38 and 39, in the rod 15. The spring, 40, of this detent is a relatively light one and merely serves to prevent the shifting of the rod 15 improperly after it has been automatically set in either of the two positions specified.

The controlling and operating means may govern any suitable type of gear-shifting mechanism proper and in any suitable way. In Figs. 2 and 3 I have illustrated one type of gear-shifting mechanism proper that may be operated from the primary power-transmitting element 11 before described as operated by the plunger 4. These views illustrate a gear-shifting mechanism comprising two principal elements, one of which is suitable selecting means for determining the change to be made in the relation of the gears, and the other of which is suitable actuating means for performing the operations determined by the selecting means. The selecting means in the present construction is a sub-mechanism adapted to be set in various ways corresponding to the speed changes to be made, the setting operations being in this case under manual control and performed by manual action. The actuating means is intended to come into operation only after the placing of the selecting mechanism in a condition or position corresponding to the speed or position of gearing to which it is desired to change. This actuating means may be either under manual control and operated manually, or it may be under proper control and operated by power. The particular construction illustrated is, as before stated, one in which a single operating power device, the potential energy of which is normally ready to be released, is employed for shifting the gear or gears to a position corresponding to the speed desired, though the bringing of the power device into action is illustrated as under manual control.

Referring to Figs. 2 and 3, 42 and 43 represent gear-shifters in the form of rods suitably connected to the usual shifting gears, (not shown). These gear-shifters are under the control of both the selecting means and the actuating or operating means, the selecting means being in this case wholly mechanical and interposed between the gear-shifters 42—43 and the aforesaid operating power device from which power is transmitted through the selecting means to said gear-shifters. The movements of this selecting mechanism are preferably determined, and are here shown as effected, by the aforesaid switch-lever 33 mounted in the upper end of the rod or post 32. Here said lever is pivoted, at 44, on an extension, 45, of an annular member, 46, mounted to turn at the upper end of the post 32 to various positions, and a spring, such as 47, will preferably hold the selecting lever and switch lever 33 up in the position shown in Figs. 1 and 2. Just below the annular support 46 for this lever there is shown secured to the post 32 in a suitable fixed position, an index-head and plate, 48, for indicating the different speed relations (not shown) of the gears. On the part 45 there is also a pointer, 49, adapted to swing over the various indications (not shown) on the index-head 48.

The horizontal turning movement of the lever 33 about the post 32 may be transmitted by any suitable means to the principal portion of the selecting mechanism. Here this movement is illustrated as transmitted mechanically through suitable connections, such as the vertical shaft 50, within the post 32 and having at its lower end a bevel-gear, 51, meshing with a bevel-gear, 52, at one end of a horizontal shaft, 53, mounted in the upper part of the casing or housing 54, which is intended to inclose the main parts of the selecting mechanism by means of which the various positions are selected, and through which movement is transmitted to the gear-shifters 42—43 by the operating means. Here the movements of the vertical shaft 50, the bevel-gears 51 and 52, and the horizontal shaft 53 are utilized to turn more or less a primary selector, shown as a barrel-cam, 55, secured to said horizontal shaft. This barrel-cam has a circumferential cam-groove, 56. As the barrel-cam is not intended to rotate, but merely to oscillate through an arc corresponding to the range of horizontal movement of the lever 33, the ends of this cam-groove are located at different points (not shown) in the length of said barrel-cam. The cam-groove 56 is intended in this construction to determine the position of a selecting-frame, such as 57, mounted to slide in suitable parallel guideways in the upper and lower parts of the housing, as shown in Fig. 3. This sliding movement of said frame is in the direction of movement of the gear-shifters 42—43. At its upper end the selecting-frame 57 has a pin, 58, that works in the cam-groove 56 and through which the walls of said cam-groove operate to slide said frame 57 to any one of the five main positions lengthwise of the gear-shifters 42—43, these positions being respectively the central or neutral point of the cam-groove and two other positions at each side thereof corresponding respectively to the four active or working positions of the gears to be controlled, that is, the first, second and third speeds ahead and the reverse speed.

The slide-frame 57 shown comprises a pair of slides connected by four rods, 59, forming a rectangular skeleton frame. On these rods actuating slides are mounted by means of which movement is intended to be imparted to one or the other of the two gear-shifters 42—43 shown. There are two of these actuating slides, each of which is designated by 60, from the center of each of which rises an actuating cam, 61, with its apex uppermost and located in vertical alinement with the center of the stud 58, that works in the cam-groove 56. Each of these actuating-cams 61 has at its inner side in this case a projection or stud, such as 62, by means of which said cams may be raised vertically. Each of these actuating-slides and its cam 61 corresponds to one of the gear-shifters 42—43, one of said cams 61 being intended to coöperate with one of said gear-shifters and the other of said cams with the other gear-shifter. According as one or the other of these slides 60 is raised to the proper extent one or the other of the gear-shifters 42—43 will be moved lengthwise. As shown, each of said gear-shifters has three positions in any one of which it may be held by a suitable spring-pressed detent, such as 63, (see Fig. 2) the construction shown being one in which either gear-shifter is moved when selected from a central or neutral position to the right or to the left, as the case may be, according to the position of the point of the corresponding actuator cam 61, to an active or working position controlling a corresponding position of the gearing. Which one of the two actuating cams 61 will be raised to move its gear-shifter 42 or 43 to one side or the other of the central neutral position will depend upon the positions of certain other parts of the selecting means. Here not only is the primary selector or barrel-cam 55 operated by the turning of the horizontal shaft 53 when the selecting lever 33 is turned, but a second selector for determining which one of the two actuating cams 61 shall be brought into action is also operated. This second selector is illustrated in this case as a rack, 64, mounted in guides and meshing with a spur-pinion, 65, secured to a stud, 66, journaled in a wall of the housing and also having in fixed relation therewith a relatively large spur-gear, 67, meshing with a spur-pinion, 68, on the shaft 53. Through this gearing 68, 67 and 65 turning movement of the shaft 53 by the selecting lever is transmitted to the rack 64, which may take any one of five different positions lengthwise corresponding to the five positions on the index-plate. Each one of these five positions of the rack 64 controls in turn a corresponding position of an actuating member, such as a lever 69, splined on a shaft, 70, so as to be movable lengthwise thereof but adapted to turn in unison therewith. The lower end of this actuating lever 69 works in the space between the inner sides of the actuating-slides 60 and under the studs 62 and the space between them. In two of its positions the actuating lever is under one of said studs and in two other positions it is under the other of said studs, and in all of these positions said lever is operative for raising said actuating slides and cams. In the fifth position the lower end of said actuating lever is in line with the space between the studs 62 and is not operative to actuate either of the cams 61. This intermediate position corresponds to the neutral position of the gear-shifters 42—43 and the gears operated thereby.

The parts just described as controlled and operated from the selecting-lever 33 and the actuating-lever 69 when swung up by the turning of the shaft 70, are sufficient to effect the selection of a gear-shifting movement for bringing the gears into operative relation corresponding to any one of the four active positions and are also sufficient, when power is applied to the shaft 70 to swing said arm 69 up as described, to bring about the necessary shifting of the parts 42—43 and the gearing corresponding to the desired speed. It being understood that suitable means will be employed for applying power to turn the shaft 70, it will be seen that these parts control the selection of two speed positions through one of the cams 61 and the gear-shifter 42, and of the other two speed positions through the other cam 61 and the gear-shifter 43; and it will also be seen that one or the other of said gear-shifters will be moved endwise in one direction or the other according as one or the other of the studs 62 of the actuating cams 61 is over the lower end of the actuating lever 69 and according as the point of such cam is at the right or at the left hand side of a stud or antifriction roller, 71, one of which is secured to the end of each gear-shifter in order that said gear-shifter may be properly actuated by its respective cam 61.

For the purpose of controlling the neutral position of the gear-shifters 42—43 and the gearing operated thereby I have shown within the housing 54 additional selecting and actuating means by means of which both gear-shifters may be moved to the neutral position in advance of the actuation of the gear-shifters to a new speed position. As set forth in my aforesaid application, it is important that the gears be maintained in mesh in one working position unless power is available for shifting the gears from that position to a working position representing another speed, as otherwise if the gears were shifted out of mesh and left out of mesh and no power were available for shifting them into mesh again a condition of danger would exist. For this reason I deem it advisable to employ actuating means common to the means for shifting to the neutral position and to the means for shifting to each of the working positions, this common actuating means being preferably a single actuator, such as the spring 2, or a manual device, for positively and substantially instantaneously moving the gear-shifters from one working position through the neutral position to another working position without stopping at the neutral point. In this case the specific means illustrated for restoring the gear-shifters to the neutral position is a pair of resetting slides, such as 72, vertically movable on guides, such as the long smooth shanks of the threaded tie-rods, 73, by means of which the cover and the body portion of the housing 54 are securely fastened together. Each of these resetting slides has a substantially triangular opening constituting a substantially triangular cam, 74, with a locating recess, 75, at the bottom thereof, for locating the studs or antifriction rolls 71 on the gear-shifters 42—43 in the central or neutral position. These resetting slides and cams are intended to be raised by suitable means, such as a resetting lever, 76, secured to the same shaft 70 as the actuating lever 69, and having at its outer end a spring-pressed by-pass pawl, 77, which on the rise of the resetting lever engages the under side of a suitable projection or stud, 78, on said resetting slide and raises the same on the rods 73 to its uppermost position, it being understood that both of the resetting slides are raised in unison by the two arms of the resetting lever 76. On reaching the top of its stroke the stud 78 slips off the end of the by-pass device 77 and thereupon the resetting slides are returned to their lowermost positions, as, for example, by gravity. In their extreme upper positions these resetting slides of course locate the gear-shifters 42—43 in their neutral positions in which they are held by the spring-pressed pins 63. On the descent of the resetting lever 76 each by-pass device 77 turns about its pivot when it strikes the projection or stud 78 and passes on to its lowermost position.

From the foregoing it will be clear that when power is applied to the shaft 70 to swing the levers 69 and 76 upward the resetting lever 76 will first raise the resetting slides 72 and restore the gear-shifters 42—43 and the gears controlled thereby to the neutral position, whereupon the slides 72 will be released by the resetting lever and will return to their lowermost positions while said lever continues to travel upward until it reaches the limit of its movement. After the resetting of the gear-shifters 42—43 in said neutral position the actuating arm 69, previously positioned in the direction of the axis of the shaft 70 by the manual selecting lever 33, will engage the under side of the stud 62 on one or the other of the actuating cams 61 and will raise said cam and cause it to operate the corresponding gear-shifter in the one direction or the other, according as the point of the cam 61 is at one side or the other of the roll 71, which position is determined by the extent and direction of the shifting movement of the slide-frame 59 which in turn, as before stated, is controlled by the cam-groove 56.

While any suitable primary actuating means may be employed to operate the parts before described located in the selected gear-shifting positions, I have here shown for this purpose the single actuator or operating power device before described, which is common to all of the gear-shifting devices and is normally energized and ready for operation when its potential energy is released. This release is here brought about by the depression of the selecting lever 33. The selection of the desired gear-shifting operation will be determined by the horizontal swing of said selecting lever, and the gear-shifting operation will result ordinarily from the release of the spring 2. In the specific construction shown in Fig. 1 of course the circuit for releasing the spring is not actually closed until the pedal 24 is depressed, but as before shown, it is not necessary to employ an additional controlling break in the combined controlling and power circuit, or to govern such a break by the foot-lever 24.

In case the source of energy or battery 48 should fail the necessary gear-shifting operations may be performed by a single actuator in the form of a manual device, such as the lever 80. This lever is splined on the shaft 70 (see Fig. 3) and has a relatively long pin, 81, extending therefrom constantly in engagement with one edge of a power lever, 82, which constitutes the immediate power-transmitting connection between the sliding operating element 11 and said shaft 70. The manual lever 80 is shiftable along the shaft 70 to the five positions of the actuating lever 69 and is connected to said lever so as to locate it in any one of said positions as desired.

What I claim is:

1. Gear-shifting mechanism, comprising, in combination with a pair of coöperative gears, a normally energized power device for moving one of said gears into mesh with the other, and latching means for normally holding said power device under restraint.

2. Gear-shifting mechanism, comprising, in combination with a set of interrelated speed-changing gears, a normally energized power device for moving a gear first out of mesh and then into a new position of mesh and means for normally holding said power device under restraint.

3. Gear-shifting mechanism, comprising, in combination with a pair of coöperative gears, a normally energized power device for moving one of said gears into mesh with the other, means for normally holding said power device under restraint, and quick let-off means for releasing said power device.

4. Gear-shifting mechanism, comprising, in combination with a pair of coöperative gears, a spring for moving one of said gears into mesh with the other, and means for normally restraining said spring.

5. Gear-shifting mechanism, comprising, in combination with a set of interrelated speed-changing gears, a spring for moving a gear first out of mesh and then into a new position of mesh and means for normally restraining said spring.

6. Gear-shifting mechanism, comprising, in combination with a pair of coöperative gears, a spring for moving one of said gears into mesh with the other, means for normally restraining said spring, and means for releasing said spring.

7. Gear-shifting mechanism, comprising, in combination with a pair of coöperative gears, a normally energized power device for moving one of said gears into mesh with the other, means for normally holding said power device under restraint, and electrical controlling means for releasing said power device.

8. Gear-shifting mechanism, comprising, in combination with a pair of coöperative gears, a spring for moving one of said gears into mesh with the other, means for normally restraining said spring, and electrical controlling means for releasing said spring.

9. Gear-shifting mechanism, comprising, in combination with a pair of coöperative gears, an operating power device for moving one of said gears into mesh with the other, and separate means for energizing said operating power device.

10. Gear-shifting mechanism, comprising, in combination with a pair of coöperative gears, an operating power device for moving one of said gears into mesh with the other, and an energizing power device for energizing said operating power device.

11. Gear-shifting mechanism, comprising, in combination with a set of interrelated speed-changing gears, an operating power device for moving a gear first out of mesh and then into a new position of mesh, and separate means for energizing said operating power device.

12. Gear-shifting mechanism, comprising, in combination with a set of interrelated speed-changing gears, an operating power device for moving a gear first out of mesh and then into a new position of mesh and an energizing power device for energizing said operating power device.

13. Gear-shifting mechanism, comprising, in combination with a pair of coöperative gears, an operating power device for moving one of said gears into mesh with the other, an energizing power device for energizing said operating power device, and means for maintaining said operating power device in its energized condition.

14. Gear-shifting mechanism, comprising, in combination with a pair of coöperative gears, an operating power device for moving one of said gears into mesh with the other, an energizing power device for energizing said operating power device, means for maintaining said operating power device in its energized condition, and means for releasing said energized operating power device.

15. Gear-shifting mechanism, comprising, in combination with a pair of coöperative gears, an operating power device of one character for moving one of said gears into mesh with the other, and an energizing power device of another character for energizing said operating power device.

16. Gear-shifting mechanism, comprising, in combination with a pair of coöperative gears, an operating power device for moving one of said gears into mesh with the other, and electrical means for energizing said operating power device.

17. Gear-shifting mechanism, comprising, in combination with a pair of coöperative gears, an operating power device for moving one of said gears into mesh with the other, and a solenoid for energizing said operating power device.

18. Gear-shifting mechanism, comprising, in combination with a pair of coöperative gears, a spring for moving one of said gears into mesh with the other, and electrical means for storing energy in said spring.

19. Gear-shifting mechanism, comprising, in combination with a pair of coöperative gears, a spring for moving one of said gears into mesh with the other, and a solenoid having a plunger for compressing said spring.

20. Gear-shifting mechanism, comprising, in combination with a pair of coöperative gears, a pair of power devices the first operative for shifting one of said gears into mesh with the other, and the second operative for energizing the first, and controlling means for said energizing power device.

21. Gear-shifting mechanism, comprising, a pair of power devices the first operative for shifting a gear and the second operative for energizing the first, and a power-operated controller for governing the action of said energizing power device.

22. Gear-shifting mechanism, comprising, in combination with a pair of coöperative gears, a pair of power devices the first operative for shifting one of said gears into mesh with the other, and the second operative for energizing the first, and controlling means for said operating power device.

23. Gear-shifting mechanism, comprising means for supplying power for governing the shifting of a gear, and means for automatically determining the period of time that power is supplied for said purpose.

24. Gear-shifting mechanism, comprising means for supplying and applying power for shifting a gear, means for starting the action of such power-supplying means, and automatic means for stopping said action.

25. Gear-shifting mechanism, comprising means for supplying and applying power for shifting a gear, means for starting the action of such power-supplying means, and automatic means for stopping said action at a predetermined time after the starting of the same.

26. Gear-shifting mechanism, comprising electrical means for supplying power for bringing about the shifting of a gear, and means for automatically determining the period of energization of said electrical means.

27. Gear-shifting mechanism, comprising electrical means for supplying power for bringing about the shifting of a gear, means for energizing said electrical means, and automatic means for deënergizing said electrical means.

28. Gear-shifting mechanism, comprising electrical means for supplying power for bringing about the shifting of a gear, means for energizing said electrical means, and automatic means controlled by the action of said electrical means for deënergizing the same.

29. Gear-shifting mechanism, comprising electrical means for supplying power for bringing about the shifting of a gear, means for energizing said electrical means, and automatic means controlled by the action of said electrical means for deënergizing the same at a predetermined moment after the beginning of energization.

30. Gear-shifting mechanism, comprising a solenoid for supplying power for bringing about the shifting of a gear, means for energizing said solenoid, and means operated by the plunger of said solenoid for automatically breaking the circuit of the solenoid at a predetermined point in the movement of said plunger.

31. Gear-shifting mechanism, comprising electrical means for supplying power for bringing about the shifting of a gear, automatic means in the circuit thereof for determining the period of said supply, and a manual circuit-controller in said circuit.

32. Gear-shifting mechanism, comprising electrical means for supplying power for bringing about the shifting of a gear, automatic means in the circuit thereof for determining the period of said supply, and a clutch-lever for normally closing a break in said circuit.

33. Gear-shifting mechanism, comprising a solenoid for supplying power for bringing about the shifting of a gear, means including a clutch-lever controlling a break in the circuit of said solenoid for energizing said solenoid, and an automatic solenoid-circuit-breaker.

34. Gear-shifting mechanism, comprising a solenoid for supplying power for bringing about the shifting of a gear, means including a clutch-lever controlling a break in the circuit of said solenoid for energizing said solenoid, and an automatic solenoid-circuit-breaker operable by the solenoid-plunger on the in-stroke thereof.

35. Gear-shifting mechanism, comprising a solenoid for supplying power for bringing about the shifting of a gear, and automatic means for making the solenoid circuit on one stroke of the plunger and for breaking it on the other.

36. Gear-shifting mechanism, comprising a solenoid for supplying power for bringing about the shifting of a gear, and automatic means governed by the movements of the solenoid-plunger for making the solenoid-circuit on one stroke of the plunger and for breaking it on the other.

37. Gear-shifting mechanism, comprising a solenoid for supplying power for governing the shifting of a gear, and an automatic double-throw switch controlled by the solenoid for making the circuit of the solenoid on one stroke of the solenoid-plunger and for breaking it on the other.

38. Gear-shifting mechanism, comprising a spring for shifting a gear, a solenoid for energizing said spring, and an automatic double-throw switch controlled by the solenoid-plunger and controlling the energization of said spring on one stroke of the plunger and its release on the other.

39. Gear-shifting mechanism, comprising a spring for shifting a gear, a solenoid for energizing said spring, an automatic double-throw switch controlled by the solenoid-plunger and controlling the energization of said spring on one stroke of the plunger and its release on the other, and means for latching said switch in each of said positions.

40. Gear-shifting mechanism, comprising a pair of power devices the first operative for shifting a gear and the second operative for energizing the first before the first goes into action, and means for automatically determining the period of said energization of the first power device by the second.

41. Gear-shifting mechanism, comprising an operating power device for shifting a gear, electrical means for energizing said operating power device before the latter goes into action, and quick-acting automatic means controlled by the energization of said electrical means for limiting the period of said energization.

42. Gear-shifting mechanism, comprising a spring for shifting a gear after the spring has been energized, a solenoid for energizing said spring, and quick-acting automatic means controlled by the energization of said solenoid for breaking the circuit of said solenoid shortly after the beginning of such energization.

43. Gear-shifting mechanism, comprising a spring for shifting a gear after the spring has been energized, a solenoid for energizing said spring, means for maintaining said spring in its energized condition, means for releasing said spring, and quick-acting automatic means controlled by the energization of said solenoid for breaking the circuit of said solenoid shortly after the beginning of such energization.

44. Gear-shifting mechanism, comprising a pair of power devices the first operative at one time for moving said gear into mesh and the second operative at a different time for energizing the first.

45. Gear-shifting mechanism, comprising, in combination with a gear, a pair of power devices the first operative at one time for moving said gear into mesh and the second being operative from a different source of energy and at a different time for energizing the first.

46. Gear-shifting mechanism, comprising a pair of power devices the first operative at one time for moving a gear into mesh and the second embodying electrical means operative at a different time for energizing the first.

47. Gear-shifting mechanism, comprising, in combination with a gear, a pair of power devices the first operative at one time for moving said gear into mesh and the second operative at a different time and for a relatively short period for energizing the first.

48. Gear-shifting mechanism, comprising, in combination with a gear, a pair of power devices the first being operative for a relatively long period of time for moving said gear into mesh and the second being operative for a relatively short period of time for energizing the first.

49. Gear-shifting mechanism, comprising, in combination with a gear, a pair of power devices the first being operative for a relatively long period of time for moving said gear into mesh and the second being operative at a different time and for a relatively short period for energizing the first.

50. Gear-shifting mechanism, comprising, in combination with a gear, an operating power device for moving said gear into mesh, and electrical means for substantially instantaneously energizing said operating power device.

51. Gear-shifting mechanism, comprising, in combination with a gear, an operating power device for moving said gear first out of mesh and then into a new position of mesh and electrical means for substantially instantaneously energizing said operating power device.

52. Gear-shifting mechanism, comprising, in combination with a gear, an operating power device for moving said gear into mesh, electrical means for substantially instantaneously energizing said operating power device, and means for maintaining said operating power device in its energized condition.

53. Gear-shifting mechanism, comprising an operating power device for moving a gear into mesh, electrical means for substantially instantaneously energizing said operating power device, means for maintaining said operating power device in its energized condition, and means for releasing said energized operating power device.

54. Gear-shifting mechanism, comprising a pair of power devices the first operative at one time for moving a gear into mesh and the second embodying electrical means operative at a different time for substantially instantaneously energizing the first.

55. Gear-shifting mechanism, comprising a pair of power devices the first operative at one time for moving a gear into mesh and the second embodying a solenoid for energizing the first and means for substantially instantaneously making and breaking the circuit of said solenoid.

56. Gear-shifting mechanism, comprising a pair of power devices the first operative for shifting a gear into mesh and the second operative for energizing the first, and controlling means for bringing said second power device into action and for releasing the first.

57. Gear-shifting mechanism, comprising a pair of power devices the first operative for shifting a gear into mesh and the second operative for energizing the first, and separate controlling devices for bringing said second power device into action and for releasing the first.

58. Gear-shifting mechanism, comprising a pair of power devices the first operative for shifting a gear into mesh and the second operative for energizing the first, and power-operated and manual controlling devices governing respectively the bringing of said second power device into action and the release of the first.

59. Gear-shifting mechanism, comprising a pair of power devices the first operative for shifting a gear into mesh and the second operative for energizing the first, and electrical controlling means for bringing said second power device into action and for releasing the first.

60. Gear-shifting mechanism, comprising a pair of power devices the first operative for shifting a gear into mesh and the second operative for energizing the first, and separate electrical controlling devices operative respectively for obtaining a substantially instantaneous action of the second power device and for releasing the first.

61. Gear-shifting mechanism, comprising a pair of power devices the first operative for shifting a gear into mesh and the second operative for energizing the first, and separate power-operated and manually-operated electrical controlling devices operative respectively for obtaining a substantially instantaneous action of the second power device and for substantially instantaneously releasing the first.

62. Gear-shifting mechanism, comprising a power device for supplying power for moving a gear into mesh, and controlling power devices for energizing said first power device and then deënergizing it.

63. Gear-shifting mechanism, comprising a solenoid for supplying power for bringing about the moving of a gear from one position to another, and power-operated switches for first making and then breaking the circuit of said solenoid.

64. Gear-shifting mechanism, comprising a spring for shifting a gear into mesh, a solenoid for energizing said spring, and power-operated switches for first making the circuit of said solenoid and then breaking it at the end of a predetermined period.

65. Gear-shifting mechanism, comprising an operating power device for moving a gear into mesh, and energizing and releasing power devices for first energizing said operating power device and then releasing it.

66. Gear-shifting mechanism, comprising a spring for moving a gear into mesh, means for holding said spring under compression, and energizing and releasing power devices for first compressing said spring and then releasing it.

67. Gear-shifting mechanism, comprising an operating power device for moving a gear into mesh, and energizing latching and releasing power devices operative respectively for first energizing said power device and then latching it in its energized condition and then releasing it.

68. Gear-shifting mechanism, comprising a power circuit including electrical means for supplying energy for bringing about the shifting of a gear into mesh, and a controlling circuit for releasing said energy.

69. Gear-shifting mechanism, comprising a power-circuit including an automatic circuit-controller and electrical means for supplying a predetermined quantity of energy for bringing about the shifting of a gear into mesh, and a controlling circuit for releasing said energy.

70. Gear-shifting mechanism, comprising a power circuit including automatic circuit-controllers for first making said circuit and then breaking it at the end of a predetermined period and also including electrical means for supplying a predetermined quantity of energy for bringing about the shifting of a gear into mesh, and a controlling circuit for releasing said energy.

71. Gear-shifting mechanism, comprising a power circuit including automatic circuit-controllers for first making said circuit and then breaking it at the end of a predetermined period and also including electrical means for supplying a predetermined quantity of energy for bringing about the shifting of a gear into mesh, and a controlling circuit for releasing said energy said circuit having a manual circuit-controller.

72. Gear-shifting mechanism, comprising a power circuit including automatic circuit-controllers for first making said circuit and then breaking it at the end of a predetermined period and also including electrical means for supplying a predetermined quantity of energy for bringing about the shifting of a gear from one position to another, and a controlling circuit for releasing said energy, said circuit having a manual circuit-controller and also having an automatic circuit-controller governed by said electrical means.

73. Gear-shifting mechanism, comprising a power circuit including electrical means for supplying energy for bringing about the shifting of a gear from one position to another, and a controlling circuit for releasing said energy, said power circuit and controlling circuit each having an automatic circuit-controller one of which is open when the other is closed and the second of which is open when the first is closed.

74. Gear-shifting mechanism, comprising a spring for shifting a gear from one position to another, a power circuit including a solenoid for energizing said spring, and a controlling circuit for releasing said spring, said power circuit and controlling circuit each having an automatic circuit-controller one of which is open when the other is closed and the second of which is open when the first is closed.

75. Gear-shifting mechanism, comprising a spring for shifting a gear from one position to another, a power circuit including a solenoid for energizing said spring, a controlling circuit for releasing said spring, and a double-throw switch operated by the solenoid-plunger for opening a break in the power circuit and closing one in the controlling circuit on one stroke of the plunger and for closing said break in the power circuit and opening that in the controlling circuit on the other stroke of said plunger.

76. Gear-shifting mechanism, comprising in combination with a gear, a spring for shifting a gear from one position to another, a power circuit including a solenoid for energizing said spring, a controlling circuit for releasing said spring, a double-throw switch operated by the solenoid-plunger for opening a break in the power circuit and closing one in the controlling circuit on one stroke of the plunger and for closing said break in the power circuit and opening that in the controlling circuit on the other stroke of said plunger, and a circuit-controller governing another break in each of said circuits and operative for closing them alternatively.

77. Gear-shifting mechanism, comprising a spring for shifting a gear from one position to another, a power circuit including a solenoid for energizing said spring, a controlling circuit for releasing said spring, a double-throw switch operated by the solenoid-plunger for opening a break in the power circuit and closing one in the controlling circuit on one stroke of the plunger and for closing said break in the power circuit and opening that in the controlling circuit on the other stroke of said plunger, and a circuit-controller operated by the clutch-lever and governing another break in each of said circuits and operative for closing them alternatively and having means for normally moving it into position for closing said break in the power circuit.

78. Gear-shifting mechanism, comprising a spring for shifting a gear into mesh, a power circuit including a solenoid for energizing said spring, means for automatically latching the spring when energized, and a controlling circuit for releasing said latching means.

79. Gear-shifting mechanism, comprising a spring for shifting a gear from one position to another, a power circuit including a solenoid for energizing said spring, means for automatically latching the spring when energized, and a controlling circuit for releasing said latching means, said power circuit and controlling circuit each having an automatic circuit-controller one of which is open when the other is closed and the second of which is open when the first is closed.

80. Gear-shifting mechanism, comprising a spring for shifting a gear into mesh, a power circuit including a solenoid for energizing said spring, and a controlling-circuit having an electromagnet for releasing said spring.

81. Gear-shifting mechanism, comprising a spring for shifting a gear into mesh, a power circuit including a solenoid the plunger of which is operative on its in-stroke for energizing said spring, means for automatically latching said plunger and the spring near the end of the in-stroke of said plunger, and a controlling circuit for releasing said latching means.

82. Gear-shifting mechanism, comprising an operating power device for moving a gear from one position to another, a power circuit including electrical means for energizing said operating power device, a controlling circuit for releasing said operating power device, and means for constantly maintaining at least one break in each of said circuits except during the momentary closing of such circuit for energizing or releasing said operating power device.

83. Gear-shifting mechanism, comprising a spring for moving a gear from one position to another, a power circuit including a solenoid for energizing said spring, means for automatically latching said energized spring, a controlling circuit for releasing said latching means, and means for constantly maintaining at least one break in each of said circuits except during the momentary closing of such circuit for energizing or releasing said spring.

84. Gear-shifting mechanism, comprising in combination with a pair of coöperative gears and with a gear shifter, a power device for moving said gear shifter to a position to bring one of said gears into mesh with the other, said power device being operative for exerting at the beginning of its action its maximum power.

85. Gear-shifting mechanism, comprising in combination with a pair of coöperative gears and with a gear-shifter, a power device for moving said gear-shifter to a position to bring one of said gears into mesh with the other, said power device being operative for exerting at the beginning of its action its maximum power which gradually decreases thereafter.

86. Gear-shifting mechanism, comprising in combination with a pair of coöperative gears and with a gear-shifter, an energizing power device, and an operating power device adapted to be energized by said first power device and operative for moving said gear-shifter to a position to bring one of said gears into mesh with the other, said operating power device being adapted to exert its maximum power at the beginning of its action.

87. Gear-shifting mechanism, comprising, in combination with a pair of coöperative gears and with a gear-shifter, an energizing power device, an operating power device adapted to be energized by said first power device and operative for moving said gear-shifter to a position to bring one of said gears into mesh with the other, said power device being adapted to exert its maximum power at the beginning of its action whenever it is released, means for normally holding said operating power device under restraint, and means for releasing said operating power device.

88. Gear-shifting mechanism, comprising, in combination with a pair of coöperative gears, a gear-shifter, and a normally energized power device for moving said gear-shifter to a position to bring one of said gears into mesh with the other.

89. Gear-shifting mechanism, comprising, in combination with a set of interrelated speed-changing gears, a gear-shifter, and a normally energized power device for moving said gear-shifter and its gear first to a position in which the gear is out of mesh and then into a new position of mesh.

90. Gear-shifting mechanism, comprising a gear-shifter having a plurality of selective movements to different positions, and selective operating means including normally energized actuating means for imparting to said gear-shifter any of said selective movements.

91. Gear-shifting mechanism, comprising a gear-shifter having a plurality of selective movements to different positions, and selective operating means including a single normally energized power device for imparting to said gear-shifter any of said selective movements.

92. Gear-shifting mechanism, comprising a pair of separate elements one controlling the shifting of the gear to neutral position and the other controlling the shifting of said gear to a working position, and normally energized actuating means common to said elements.

93. Gear-shifting mechanism, comprising a pair of separate elements one controlling the shifting of the gear to neutral position and the other controlling the shifting of the gear to a working position, and a single normally energized power device for effecting said movements.

94. Gear-shifting mechanism, comprising a pair of separate elements one controlling the shifting of the gear to neutral position and the other controlling the shifting of said gear to working position, and a single spring for effecting said movements.

95. Gear-shifting mechanism, comprising a pair of separate elements one controlling the shifting of the gear to neutral position and the other controlling the shifting of said gear to a working position, a single spring for effecting said movements, and means for normally holding said spring under restraint.

96. Gear-shifting mechanism, comprising, in combination with a pair of coöperative gears, a gear-shifter, resetting means controlling the movement of said gear-shifter to one position, and normally energized actuating means for moving said gear-shifter to another position in which its gear is in mesh.

97. Gear-shifting mechanism, comprising gear-shifting means having a plurality of gear-shifting movements, a single normally energized power device for effecting said movements, and means for normally holding said power device under restraint.

98. Gear-shifting mechanism, comprising gear-shifting means having a plurality of gear-shifting movements, a single spring for effecting said movements, and means for holding said spring under restraint.

99. Gear-shifting mechanism, comprising gear-shifting means having a plurality of gear-shifting movements, and a single normally energized power device for shifting a plurality of gears each from one individual working position through neutral position to another individual working position.

100. Gear-shifting mechanism, comprising gear-shifting means having a plurality of gear-shifting movements, a single normally energized power device for shifting a plurality of gears each from one individual working position through neutral position to another individual working position, and means for normally holding said power device under restraint.

101. Gear-shifting mechanism, comprising gear-shifting means having a plurality of gear-shifting movements, a single operating power device for effecting said movements, and a single energizing power device for energizing said operating power device.

102. Gear-shifting mechanism, comprising gear-shifting means having a plurality of gear-shifting movements, a single operating power device of one character for effecting said movements, and a single energizing power device of another character for energizing said operating power device.

103. Gear-shifting mechanism, comprising gear-shifting means having a plurality of gear-shifting movements, a single operating power device for effecting said movements, and electrical means for energizing said operating power device.

104. Gear-shifting mechanism, comprising gear-shifting means having a plurality of gear-shifting movements, a single spring for effecting said movements, and a single solenoid for energizing said spring.

105. Gear-shifting mechanism, comprising gear-shifting means having a plurality of gear-shifting movements, a pair of power devices the first operative for effecting each of said movements and the second operative for energizing the first, and controlling means for bringing said second power device into action and for releasing the first.

106. Gear-shifting mechanism, comprising gear-shifting means having a plurality of gas-shifting movements, a pair of power devices the first operative for effecting each of said movements and the second operative for energizing the first, and separate electrical controlling devices operative respectively for obtaining a substantially instantaneous action of the second power device and for releasing the first.

107. Gear-shifting mechanism, comprising gear-shifting means having a plurality of gear-shifting movements, a single power device for supplying power for effecting said movements, and means for automatically determining the period of said supply.

108. Gear-shifting mechanism, comprising gear-shifting means having a plurality of gear-shifting movements, a single electrical device for supplying power for bringing about said movements, and means for automatically determining the period of energization of said electrical device.

109. Gear-shifting mechanism, comprising gear-shifting means having a plurality of gear-shifting movements, a single electrical device for supplying power for bringing about said movements, means for energizing said electrical device, and automatic means for deënergizing said electrical device.

110. Gear-shifting mechanism, comprising gear-shifting means having a plurality of gear-shifting movements, a single power circuit including electrical means for storing energy for governing said movements, and a single controlling circuit for releasing said energy.

111. Gear-shifting mechanism, comprising gear-shifting means having a plurality of gear-shifting movements, a single power circuit including electrical means for storing energy for governing said movements, and a single controlling circuit for releasing said energy, said power circuit and controlling circuit each having an automatic circuit-controller one of which is open when the other is closed and the second of which is open when the first is closed.

112. Gear-shifting mechanism, comprising gear-shifting means having a plurality of gear-shifting movements, a single operating power device for effecting said movements, a single power circuit including electrical means for energizing said operating power device, a single controlling circuit for releasing said operating power device, and means for constantly maintaining at least one break in each of said circuits except during the momentary closing of such circuit for energizing or releasing said operating power device.

113. Gear-shifting mechanism, comprising gear-shifting means having a plurality of gear-shifting movements, and a single power device for effecting said movements, said power device being operative for exerting at the beginning of its action its maximum power.

114. Gear-shifting mechanism, comprising gear-shifting means having a plurality of gear-shifting movements, and a single power device for effecting said movements, said power device being operative for exerting at the beginning of its action its maximum power which gradually decreases thereafter.

115. Gear-shifting mechanism, comprising gear-shifting means having a plurality of gear-shifting movements, selecting means movable into and out of position for controlling said movements selectively, and normally energized actuating means for effecting said movements.

116. Gear-shifting mechanism, comprising gear-shifting means having a plurality of gear-shifting movements, selecting means movable into and out of position for controlling said movements selectively, and a single normally energized power device for effecting said movements.

117. Gear-shifting mechanism, comprising gear-shifting means having a plurality of gear-shifting movements, a single selector movable into and out of position for controlling said movements selectively, and a single normally energized power device for effecting said movements.

118. Gear-shifting mechanism, comprising gear-shifting means having a plurality of gear-shifting movements, a single selector movable into and out of position for controlling said movements selectively, and a single spring for effecting said movements.

119. Gear-shifting mechanism, comprising gear-shifting means having a plurality of gear-shifting movements, selecting means movable into and out of position for controlling said movements selectively, and normally energized actuating means for operating upon the gear-shifting means through said selecting means to effect the selected movements.

120. Gear-shifting mechanism, comprising gear-shifting means having a plurality of gear-shifting movements, selecting means movable into and out of position for controlling said movements selectively, and a single normally energized power device for operating upon the gear-shifting means through said selecting means to effect the selected movements.

121. Gear-shifting mechanism, comprising selectively operable gear-shifters, and normally energized actuating means for operating the selected gear-shifter.

122. Gear-shifting mechanism, comprising selectively operable gear-shifters, and a single normally energized power device common to said gear-shifters for operating the one selected.

123. Gear-shifting mechanism, comprising selectively operable gear-shifters, and a single normally energized spring common to said gear-shifters for operating the one selected.

124. Gear-shifting mechanism, comprising selectively operable gear-shifters, a single selector common to said gear-shifters and movable into and out of selecting relation therewith, and normally energized actuating means for operating the selected gear-shifter.

125. Gear-shifting mechanism, comprising selectively operable gear-shifters, a single selector common to said gear-shifters and movable into and out of selecting relation therewith, and a single normally energized power device common to said gear-shifters for operating the selected gear-shifter.

126. Gear-shifting mechanism, comprising selectively operable gear-shifters, resetting means controlling the movements of said gear-shifters to their neutral position, and normally energized actuating means controlling the movements of said gear-shifters to a working position.

127. Gear-shifting mechanism, comprising a plurality of separately-operable gear-shifters each movable to a plurality of positions corresponding to different gear connections, and normally energized actuating means for moving said gear-shifters to the selected positions.

128. Gear-shifting mechanism, comprising a plurality of separately-operable gear-shifters each movable to a plurality of positions corresponding to different gear connections, and a single normally energized power device common to said gear-shifters and all positions thereof for moving them to the selected positions.

129. Gear-shifting mechanism, comprising selecting means for determining the shifting of the gearing to neutral and to a working position, and normally energized actuating means for effecting said shifting movements successively in predetermined timing.

130. Gear-shifting mechanism, comprising selecting means for determining the shifting of the gearing to neutral and to a working position, and a single normally energized power device for effecting said shifting movements successively in predetermined timing.

131. Gear-shifting mechanism, comprising gear-shifting means, a relatively short power circuit including means for operating said gear-shifting means, and a controlling circuit embodying a controlling device operable by current of low amperage.

132. Gear-shifting mechanism, comprising gear-shifting means, a relatively short power circuit of low resistance including electrical means for operating said gear-shifting means, and a controlling circuit embodying a controlling device operable by current of low amperage.

133. Gear-shifting mechanism, comprising in combination with a pair of coöperative gears, a relatively short power circuit of low resistance containing an automatic circuit-controller and electrical means for sup- plying energy for shifting one of said gears relatively to the other.

Signed at New Haven, in the county of New Haven and State of Connecticut, this 15th day of November A. D. 1913.

CHARLES R. UNDERHILL.

Witnesses:
BESSIE E. HOWARD,
AGNESS V. MANNING.